July 4, 1967 R. HELL 3,329,769

METHOD AND APPARATUS FOR FACSIMILE ELECTROSTATIC REPRODUCTION FOR TELEGRAPHY RECEIVERS

Filed June 3, 1964

4 Sheets-Sheet 1

July 4, 1967 R. HELL 3,329,769

METHOD AND APPARATUS FOR FACSIMILE ELECTROSTATIC REPRODUCTION FOR TELEGRAPHY RECEIVERS

Filed June 3, 1964

4 Sheets-Sheet 4

United States Patent Office 3,329,769
Patented July 4, 1967

3,329,769
METHOD AND APPARATUS FOR FACSIMILE ELECTROSTATIC REPRODUCTION FOR TELEGRAPHY RECEIVERS

Rudolf Hell, Kiel, Germany, assignor to Dr.-Ing. Rudolf Hell Kommanditgesellschaft, Kiel-Dietrichsdorf, Germany Filed June 3, 1964, Ser. No. 372,251
Claims priority, application Germany, June 4, 1963, H 49,347
15 Claims. (Cl. 178—6.6)

The invention relates to a page-recording method for picture telegraphy receivers and apparatus therefor using a circulating endless tape serving as an intermediate recording carrier, on to which the received picture signals, representing the picture lines scanned at the transmitter end, are continually successively recorded as picture points and are stored at least for the length of one line, the individual stored lines, each in its entirety, being subsequently transferred in proper relative phase relation one below the other to a sheet of paper transported perpendicularly to the direction of movement of the tape, and after a stored line has been transferred, the recorded picture points of such line being erased from the tape.

In applicant's U.S. Patent No. 2,853,551 issued on Sept. 23, 1958, there is disclosed a page-printing method for facsimile receivers of the type described, in which the pitcure signals are recorded on the circulating tape by means of a color-releasing recording system, and transference of the recording from the tape to the sheet of paper is effected by printing with a periodically operated printing mechanism. The receiver is only able to record black and white signals, i.e., characters and line pictures, but no half tones. Even if the recording speed is considerably greater than that of other known page-printing methods, it is nonetheless limited by the inertia of the electromechanically operating printing system and printing mechanism. The speed of the tape could, however, be considerably increased if it were possible to effect the recording and transferring of the record to the paper in an inertialess fashion.

A xerographic method for the reproduction of written and picture orignals is known which uses an electrostatic charge image which is applied to an electrically insulating record carrier provided with a photo-conductive layer and is rendered visible by means of a fine powder. The photo-conductive layer is first evenly charged so that a homogeneous charge image results. The transparent picture original to be reproduced is then laid upon the charged layer and the layer is exposed through the picture original. For changes in scale, the picture original may also be projected onto the charged layer. The layer is discharged at the exposed places according to the strength of exposure so that a positive charge image is produced. A fine synthetic resin powder charged to opposite polarity is then scattered on the layer and fused into it by the effect of heat thus rendering the charge image visible. Furthermore an electrographic method for recording characters or pictures analyzed into picture elements for purposes of picture or facsimile telegraphy is known using an electrostatic charge image which is applied to a record carrier provided with an insulating layer, and is rendered visible by means of fine powder, said method consisting in the fact that the field strength of an electrostatic field existing between a positively guided electrode and a counter electrode, in which the record carrier is located, is electromechanically or electrically modulated by scanning the document or picture original according to the brightness of the character or picture elements.

According to the invention, the recording of the picture points on a circulating intermediate carrier and the transference of the recorded picture lines on to the sheet of paper as well as the operation of rendering the transferred picture lines visible, are effected by xerographic means.

The advantages of the method according to the invention over the above-mentioned picture printing method for facsimile receivers are first, a considerable increase in the recording speed due to the use of the inertialess xerographic recording method, at least when the modulation of the charge image is effected electrically; and second, the possibility of also recording half-tone pictures.

Four embodiments of the invention are illustrated in FIGS. 1 to 4, partly in perspective and partly diagrammatically.

In the drawings, wherein like reference characters indicate like or corresponding parts:

Figure 1:
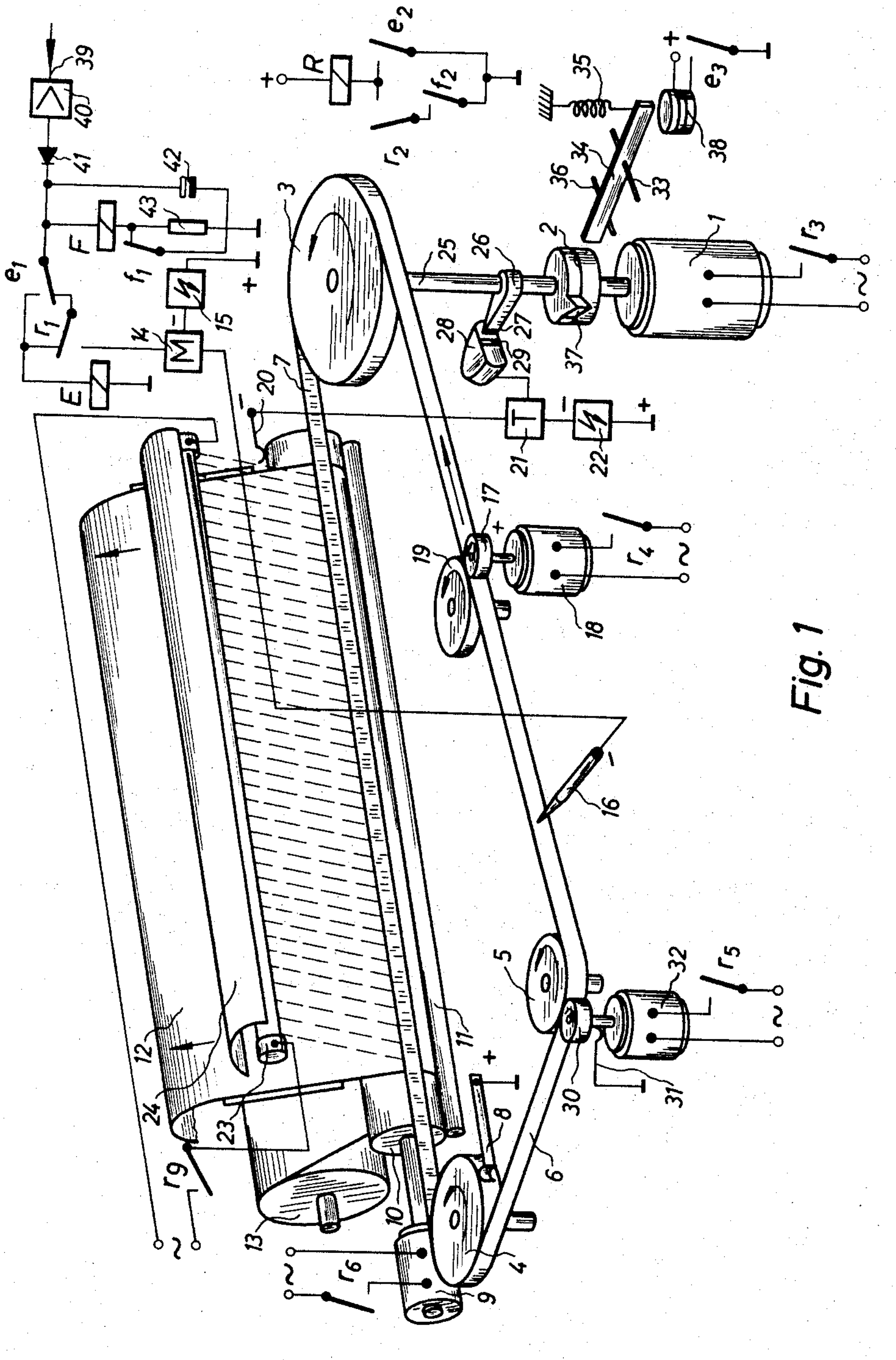
FIG. 1 illustrates a picture telegraphy receiver wherein the circulating tape is dusted with a powder.

In the arrangement illustrated in FIG. 1, the motor 1 drives the tape drive pulley 3 in the direction of the arrow by means of the slip clutch 2. The endless tape 6 is driven in the direction of the arrow at constant speed by means of the pulley 3 and the guide pulleys 4 and 5. The tape 6 is constructed of an electrically insulating plastic material and is provided on its inner face with a metal lining or layer 7, which is grounded by the metal guide pulley 4 and the sliding contact 8.

The motor 9 drives the paper advancing roller 10 at a constant speed of rotation through a reduction gear, not illustrated in the drawing, the surface of the roller 10 being provided with a metallic coating. This roller and the counter pressure roller 11 will draw the sheet of paper 12 from the storage roll 13, and slowly and continuously advances the sheet in the direction of the arrow. The relationship between the peripheral speeds of the roller 10 and the pulley 3 is so selected that during the time taken by the tape 6 to move the length of a recording line, the sheet of paper 12 moves the distance of the line width, i.e., a few tenths of a millimetre. The circumference of the drive pulley 3 is equal to the length of a complete recording line.

The recording of the received picture signals, which in the modulator 14, modulate a high voltage from the high voltage source 15, is effected by means of the needle electrode 16 which is connected to the output of the modulator 14. An electrostatic field is created between the metallic lining 7 of the tape 6 and the needle electrode 16, the field strength of which is modulated in accordance with the instantaneous picture signal voltage. If, for example, the electrode 16 is negative and the lining 7 of the band is positive, corona discharges cause negative charges to be sprayed on to the side of the band 6 adjacent the electrode 16, which negative charges, when the tape moves, are arranged along a line which comprises the recording line, the density of such charges being modulated in accordance with the blackness of the picture points of the picture originals scanned in the transmitter. Since the amplitude of the picture signal, produced in the transmitter during the photo-electric scanning of the picture image to be transmitted, is proportional to the brightness of the picture points of the original, a conversion stage for the tonal value must be present either in the transmitter or the receiver to render the amplitude of the picture signal used for recording proportional to the blackness of the picture points of the picture original, thus to render it the "negative" of the primary picture signal.

In order to render the latent charge image visible, it is dusted with a xerographic synthetic resin powder charged at opposite polarity with the powder adhering to the charged places according to the charge density. Dusting is effected, for example, by means of the rotating magnetic brush 17 which is driven by the motor 18, the counter pressure roller 19 maintaining the tape 6 in proper relation to the brush 17. The xerographic powder consists, for example, of a mixture of fine iron filings and synthetic resin powder. When these are mixed together, the triboelectrical effect causes the iron filings to be charged negatively and the powdered synthetic resin to be charged positively, so that the iron filings bind the particles of synthetic resin powder. When dusting is effected by means of the magnetic brush, which consists primarily of a permanent magnet, the negatively charged tape 6 attracts the positively charged particles of synthetic resin thereto, holding them fast, while the iron filings remain adhering to the permanent magnet.

Other known devices may be used instead of the known dusting device described, such as, for example, a rotating brush which is covered with certain animal hairs. When the brush rotates, the hairs draw particles of powder out of a storage container, friction causing the hairs and powder particles to be charged with opposite polarity so that the former hold the latter fast. The greater charging of the tape 6 causes the particles of powder to be withdrawn from the brush to the tape 6.

Every time a section of the tape with a dusted complete recording line arrives in front of the sheet of paper 12, the powder image is transferred from the tape 6 to the sheet of paper 12 substantially instantaneously by means of a constant and homogeneous electrical field which is periodically and pulsewise set up, with the field being generated along the recording line between the metal surface of the paper driving roller 10 and the metallic inner lining 7 of the tape 6. The surface of the roller 10 is connected to the negative pole of the high voltage source 22 by means of the sliding contact 20 and the controllable gating stage 21. For every voltage pulse which is released through the gating stage 21, a line-shaped powder image is withdrawn from the band 6 and deposited upon the sheet of paper 12 in an accurate reproduction of the original picture. By means of the infrared quartz lamp 23, the heat rays of which are concentrated by the cylindrical reflector 24 along a line perpendicular to the sheet of paper 12, the successively transferred line-shaped powder images are fused in and thus fixed on the paper.

The cam 26, secured on the shaft 25 of the pulley 3, serves for periodically releasing the high voltage pulse, said cam carrying at its pointed end a small wedge-shaped permanent magnet 27 cooperable with the pick-up head 28. At each rotation of the cam 26, when it passes the air gap 29 of the pick-up head 28, the magnet 27 induces in the coil of said pick-up head a voltage pulse which, after amplification, opens the gating stage 21 for a short period and thus releases a high voltage pulse from the generator 22 to the sliding contact 20.

After each transference of a recording line from the tape 6 to the sheet of paper 12, the tape must be cleaned of particles of any powder adhering thereto, and any charge thereon be discharged. The rotating brush 30, provided with fine metal bristles serves for this purpose, said brush being grounded through the sliding contact 31 and driven by the motor 32.

The lever 34 mounted for pivotal movement about the shaft 33 serves for phasing the facsimile receiver with respect to the release, in correct phase, of the high voltage pulses before commencement of reception of a transmission. In the rest position, the forward end of said lever is raised by the spring 35 so that its rear end is seated on the support 36, releasing the cam 37 on the upper half of the slip clutch 2. When the starting signal is received from the transmitter, the magnet 38 is energized, drawing the front end of the lever 34 downwardly against the pull of the spring 35. This causes the rear end of the lever 34 to be raised to a position in the path of the cam 37, thereby holding the shaft 25 in this phase position. Upon connection of the starting signal, the magnet 38 is de-energized, permitting the front end of the lever 34 to drop and thereby release the cam 37 so that the shaft 25 is driven through the slip clutch 2.

The angular spacing between the cam 26 in its phase position, and the gap 29 of the pick-up head 28, as measured in the direction of rotation, is so calculated that after commencement of reception, the gating stage 21 is initially opened when the tape 6 has moved by an amount which is equal to the remainder produced when the tape length between the point of the recording electrode 16 and the left writing edge on the sheet of paper 12, as measured in the direction of the arrow, is divided by the length of the recording line. At the commencement of a recording, the gating stage is operated freely at least once before the beginning of the recording of the first line has reached the left-hand writing edge of the sheet of paper 12. The number of free operations depends upon the above-mentioned length of the tape and is equal to the quotient of the length of the tape and of the recording line without taking the remainder into consideration.

The basic receiver circuit is illustrated at the upper right-hand portion of the drawing. The telegraphic pulses received from the transmitter over the long distance line 39 are amplified in the amplifier 40 and demodulated in the rectifier 41. Before commencement of transmission, the transmitter sends a start signal in the form of a continuous tone of about one second duration, in order to switch in the receiver motors and to phase the starting position of the gating stage 21. The receiver relay E and the operating relay R are provided for this purpose, while the switching off relay F serves for switching off the receiver. The start signal, which is assumed to be of the same amplitude as the telegraphy signal, charges the very high capacity condenser 42 and switches on the relay F over the operating contact $f1$. This causes the contact $f1$ to open and the rest contact $f2$ in the circuit of the relay R to close. The relay F now receives a smaller current due to the effect of the resistor 43, but is not thereby de-energized. The starting signal passes on to the relay E over the switching contacts $e1$ and $r1$, thus energizing said relay, causing $e1$ to reverse so that the relay E remains energized, while $e2$ closes, thus causing the relay R to be energized. The holding contact $r2$ closes and the R-relay remains energized over contacts $r2$ and $f2$. $r1$ also reverses but this has no immediate effect. The starting signal cannot reach the modulator 14 since $e1$ is in the upper position. The contact $e3$ then closes, energizing the magnet 38 and causing the rear end of the lever 34 to move into the path of the cam 37. Finally contacts $r3$, $r4$, $r5$ and $r6$ close, causing the motors 1, 18, 32 and 9 to start. The cam 37, driven by the slip clutch, rotates into the phase position in which it is held by means of the locking lever 34.

Upon termination of the start signal, transmission is effected from the transmitter of the first picture telegraphy signal of the first picture line to be transmitted, the relay E is de-energized, causing contact $e1$ to move to its lower position, effecting connection of the modulator 14 to the long distance line 39 over the contact $r1$ also in its lower position. Contact $e2$ then opens but this does not cause the relay R, which remains held over contacts $r2$ and $f2$ to become de-energized. Contact $e3$ then opens, de-energizing the magnet 38 and releasing the cam 37 so that the tape 6 begins to circulate. The charge of the condenser 42 is maintained by the telegraphy pulses.

The receiver is switched off when no telegraphy pulses are received from the transmitter over a period of half a minute, the condenser 42 then slowly discharges up over the large resistor 43. The time constant of this RC-circuit is so calculated that the relay F switches off after about half a minute. This causes contact $f1$ to close and contact $f2$ to open, interrupting the circuit of the relay R. Contact r1 moves to the upper position and contacts r2, r3, r4, r5 and r6 open, thus switching off all the motors. The picture telegraphy receiver is now ready for a new start.

Figure 2:
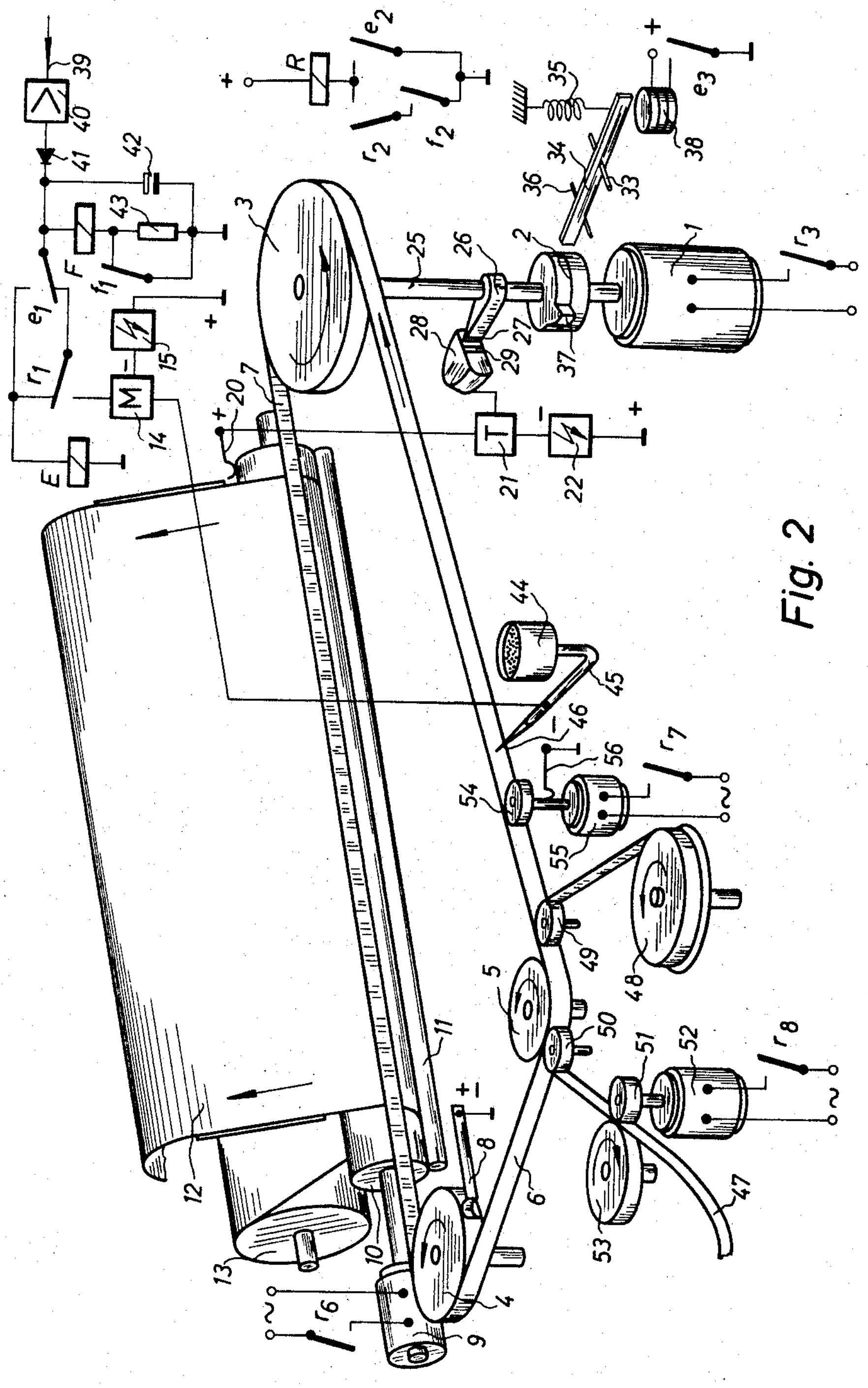
FIG. 2 illustrates a picture telegraphy receiver wherein the circulating tape is sponged with a dye.

FIG. 2 illustrates a picture telegraphy receiver in which the circulating tape is colored with a dye. The embodiment of FIG. 2 is very similar to that of FIG. 1 and as previously mentioned, like parts are given like reference numerals.

In place of the needle electrode 16 in FIG. 1, a dye distributor is provided in FIG. 2 for the spraying of the charges, consisting of a container 44 for a liquid dye and a metallic capillary outlet tube 45 terminating in a point 46, which tube is electrically connected to the output of the modulator 14. An electrostatic field is generated between the inner lining 7 of the tape 6 and the point 46 of the capillary tube 45, the field strength of which is amplitude, modulated by the picture signals. This field exerts an electrostatic force on the particles of dye leaving the point 46 of the capillary tube 45. If, for example, the lining 7 of the tape 6 is positive and the point 46 is negative, a point discharge is produced in the space of the field, thus causing ionization by impact of the air atoms. The positive air ions bombard the film of dye adhering to the point 46 and atomize the dye. The negatively charged particles of dye thus produced are drawn along the field lines in the direction of the positive lining 7 and adhere to the tape 6 by the power of adhesion. Consequently, a recording of a picture element is produced at the recording locations, the density of dye corresponding to the blackness of the picture element of the original scanned in the transmitter.

Each time the beginning of a recording line reaches the left writing edge of the sheet of paper 12, the color dye of a recorded line must be transferred to the sheet of paper 12. For this purpose a constant homogeneous electrostatic field is periodically and pulsewise generated between the positive metallic surface of the paper driving roller 10 and the negative inner lining 7 of the tape 6, between which the sheet of paper 12 moves, said field attracting the negatively charged particles of dye from the tape on to the paper, so that the particles thus penetrate into the fibers of the paper. The high voltage is provided by the generator 22 which is periodically and momentarily gated by the gating stage 21, which in turn is controlled by the pick-up head 28, in the coil of which a voltage pulse is induced when the permanent magnet 27 passes the air gap 29.

Once a recording line has been transferred from the tape 6 to the sheet of paper 12, the tape must be cleaned of all remaining particles of dye and be discharged before fresh dye can be spread thereon. The tape 47, of absorbent paper, drawn from a storage roll 48 serves this purpose, with the two pressure rollers 49 and 50 pressing the absorbent paper against the tape 6 at the tape guide pulley 5. The absorbent paper 47 is advanced by means of the feed roller 51 which is driven by the motor 52 and the counter pressure roller 53, the absorbent paper moving in the direction of the arrows, opposite to the direction of travel of the tape 6.

When the tape 6 has been cleaned, it must still be freed of any remaining surface charges, which is accomplished by means of the rotating brush 54 consisting of fine metal bristles, the brush being driven by means of the motor 55, and grounded by the sliding contact 56.

The receiver circuit in this embodiment is the same as that described with reference to FIG. 1. In view of the additional functions requiring motors 55 and 52, the relay R in FIG. 2 is provided with additional contacts r7 and r8 which open or close the supply lines to the two motors.

Figure 3:
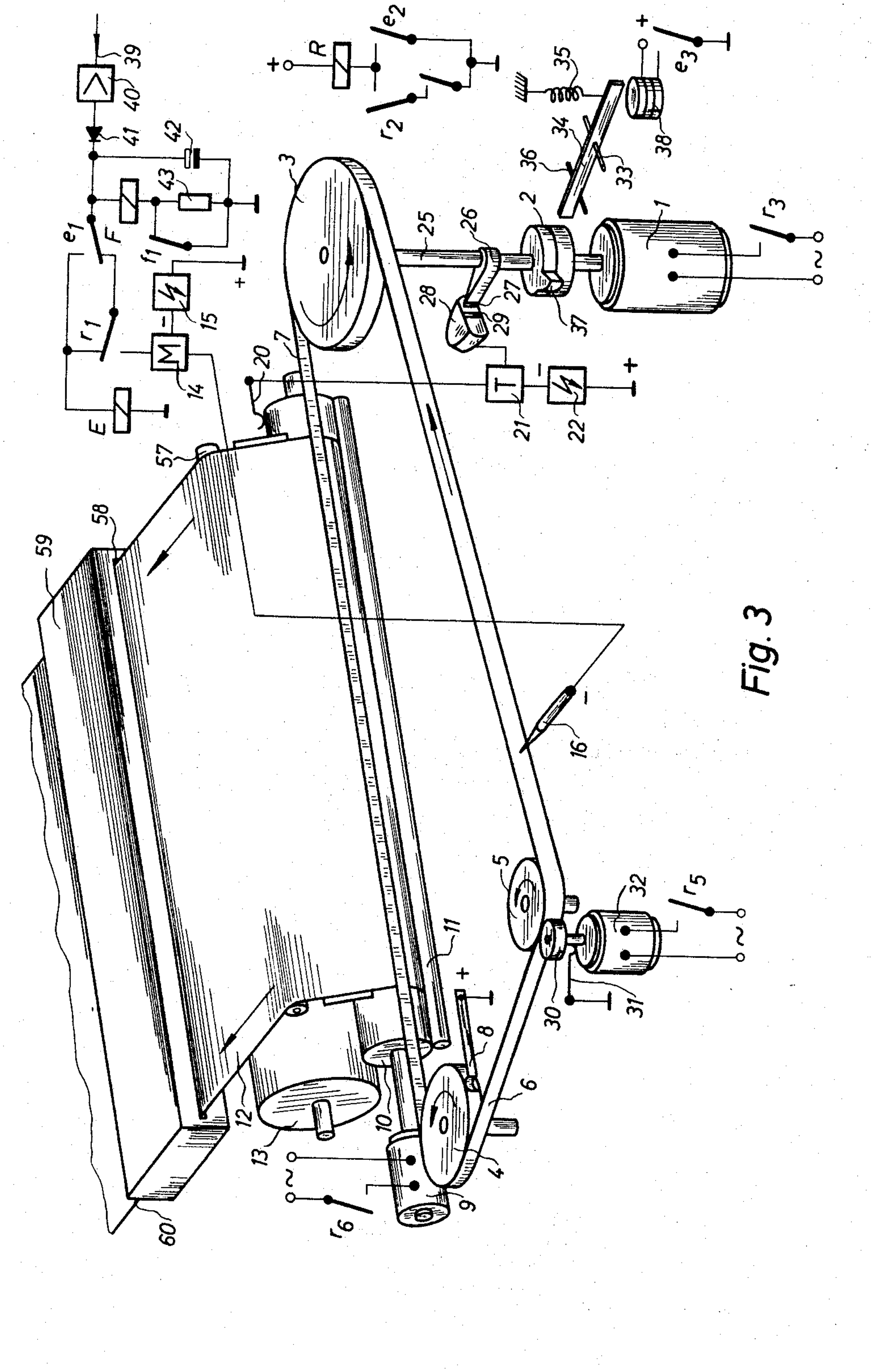
FIG. 3 illustrates a picture telegraphy receiver wherein only the circulating tape is charged; and, FIG. 4 illustrates a picture telegraphy receiver in which the charge image is applied to the circulating tape according to the exposure process.

FIG. 3 illustrates a picture telegraphy receiver wherein the circulating tape is merely charged. The arrangement of FIG. 3 likewise is very similar to FIG. 1 and like parts are designated by like reference numerals.

In FIG. 3, as in FIG. 1, a line shaped, modulated charge image is produced on the circulating tape 6 by means of the needle electrode 16. Each time a charged section of tape, having the length of a complete recording line arrives in front of the sheet of paper 12, a periodically pulse constant homogeneous electrostatic field is generated between the metallic surface of the paper driving roller 10 and the metallic inner lining 7 of the tape 6 and causes the charge-carriers, i.e., air ions, to be drawn from the tape on to the paper. Once the charge image has been transferred from the tape to the paper in this manner, the paper in this case being coated with a thin layer of plastic material with very good electrical insulating properties, the charge image is subsequently rendered visible on the paper and fixed. For this purpose it may, as previously described, be dusted with a xerographic powder which is fused into the paper by the effect of heat. It is also possible, however, to use liquid developers such as are finding increasing use, which developers consist of a dye in a volatile dielectric solvent which has the property of causing the developer to flow away at the uncharged places while the dye is held fast at the charged places. After the solvent has evaporated, the remaining dye dries on the charged places and the density of the dye corresponds to the density of charge.

The charged sheet of paper 12 is led over the return roller 57 through a slot 58 into a developing tank 59 where it is developed and subsequently discharged on the opposite side through a second slot 60.

The receiver circuit of the picture telegraphy receiver is the same as that illustrated in FIG. 1, and the phasing of the receiver is also effected in the same manner as previously described.

Figure 4:
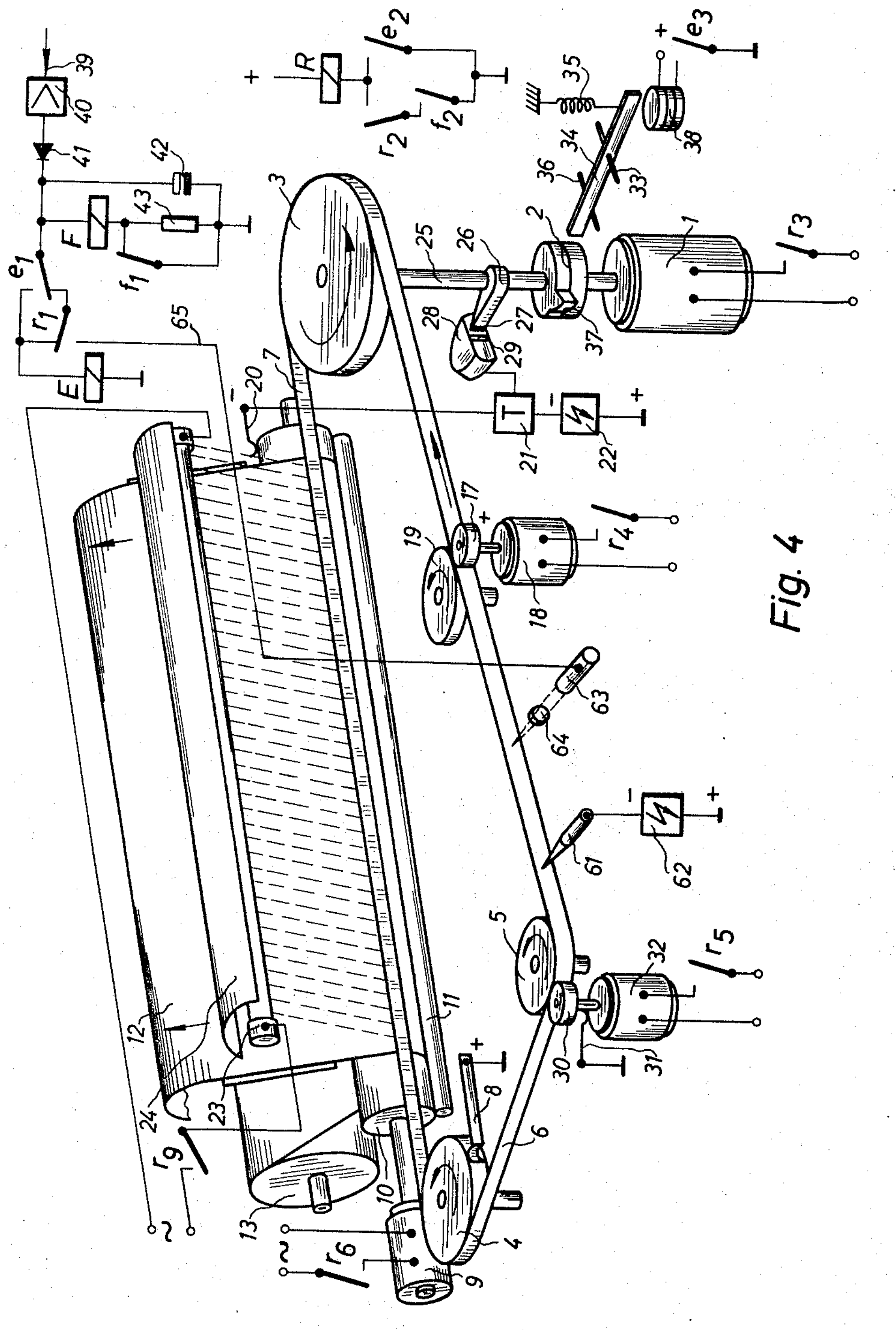

FIG. 4 illustrates a further embodiment of this invention in which the charge image is applied to the circulating tape according to the light exposure process. The arrangement of FIG. 4 likewise is very similar to FIG. 1, the circulating tape 6 again consisting of a plastic material with good insulating properties, and is provided with metallic inner lining 7. It is now also provided with an outer photo-conductive layer, e.g., of selenium, zinc oxide or anthracene. These substances are known to have a high specific electric resistance in the dark so that they act as insulators. During exposure to light, the resistance is diminished in proportion to the amount of exposure so that these substances act as electrical conductors.

Prior to the arrival of the tape 6 at the recording location, the photo-conductive layer of the tape is negatively charged, in the dark, along the recording line in an electrostatic field with constant field strength, so that a constant charge density is produced along the recording line. The electrostatic field therefore is generated between the positive grounded metallic inner lining 7, of the tape 6 and the negative needle electrode 61 by means of the high voltage source 62. A corona discharge causes negative charge carriers of constant charge density to be sprayed on to the photo-conductive outer layer of the tape 6. Located at the recording location is a controllable recording glow lamp 63, the light from which is concentrated by the condenser lens 64 to a small point or dot on to the tape 6 at the level of the recording line. The light intensity of the recording lamp 63 is modulated by the received picture telegraphy signals. This causes the discharge of the tape 6 in proportion to the instantaneous light intensity so that the density of the charge on the tape 6 is modulated in accordance with the blackness of the picture original to be transmitted. In this case there is no need for a tonal value reversal stage in the transmitter or receiver. The operation otherwise corresponds to that illustrated in FIG. 1. Only the modulator stage 14 and the high voltage source 15, shown in FIG. 1, are omitted, and the signal conductor 65 in FIG. 4 directly connects the receiver circuit to the control electrode of the recording lamp 63.

The exposure process described with reference to FIG. 4 cannot be applied to the process described with reference to FIG. 2 in which the circulating tape is modulated by coloring with a liquid dye. It is, however, possible to apply it to the process described with reference to FIG. 3, in which the circulating tape is merely charged and the charge carriers are transferred to the sheet of paper.

The embodiments described merely illustrated the basic modes of operation, and numerous constructional modifications may be effected thereto. It is thus, e.g., possible to locate a fixed needle electrode at the recording location in place of the metallic inner lining 7 of the circulating tape 6, said needle electrode facing the needle electrode 16 and being separated therefrom by the tape 6. Similarly a fixed thin wire electrode of the length of a line may be arranged at the transfer location, which electrode is juxtaposed to the paper transporting roller 10 and separated therefrom by the tape 6 and the sheet of paper 12.

Changes may be made within the scope and spirit of the appended claims which define what is believed to be new and desired to have protected by Letters Patent.

I claim:

1. A method for xerographic facsimile reproduction from received signals representing lines of a scanned image, comprising the steps of electrostatically storing on an intermediate storage media, at a storage location, a portion of an individual line, moving said storage media with respect to said storage location in the direction of the line to be formed whereby an entire line is sequentially stored thereat, and successively stored lines are disposed in end to end relation, moving the storage media into a line-transfer location, in the direction of a line to be transferred thereat, moving the sheet upon which the facsimile is to be reproduced, into said line-transfer location, in a direction perpendicularly to a line to be transferred, for the transfer of successive lines thereto, effecting at said transfer location an electrostatic transfer simultaneously from the storage media to the sheet of at least one entire line so stored on said media, for the production of a visible image, and thereafter clearing the storage media of the stored material, for reuse in connection with the reproduction of a succeeding line.

2. A method as defined in claim 1, wherein the storage on said media is effected by means of an electrostatic field, and electrically modulating said field by the received picture signals.

3. A method as defined in claim 2, comprising the further step of electrostatically applying to said media, following storage of the picture signals thereon, a material capable of producing a visible reproduction, and effecting transfer of said stored signals from said media to said sheet by transfer of said visible material from the media to the sheet.

4. A method as defined in claim 2, comprising the further step of processing the sheet of paper with the transferred material thereon to render the same visible.

5. Apparatus for xerographic facsimile reproduction from received picture signals, comprising an endless tape constructed for use as an intermediate storage carrier of the received signals representing picture lines scanned at the transmitter, means for operatively supporting a sheet of paper for ultimate receipt of the stored picture lines, recording means for electrostatically effecting sequential recording, in line direction, of the respective individual picture lines, each in its entirety, on said tape, means for moving said tape in operative relation to said recording means in line direction and said sheet for receipt of successive picture lines in end to end relation on said tape from said recording means and successive transfer thereof from said tape to said sheet in proper relation, means for electrostatically effecting the transfer of an individual stored line, in its entirety, from the tape to said sheet, means for advancing said sheet in a direction transverse to the line direction to accommodate successive lines thereon in proper relation, and means for clearing the tape for reuse following transfer of the stored material to said sheet.

6. Apparatus as defined in claim 5, wherein said recording means comprises two oppositely disposed electrodes between which an electrostatic field is generated, through which field the tape moves, and means for operatively conducting the picture signals to said electrodes whereby such field is electrically modulated by the received picture signals.

7. Apparatus as defined in claim 6, wherein one of said electrodes is in the form of metallic layer carried by said tape, the latter consisting of an electrically insulating plastic material.

8. Apparatus as defined in claim 5, wherein said tape is provided with a photo-conductive layer and said recording means comprises a light source, the intensity of which is electrically modulated by the received picture signals so that the density of the charge of the tape is modulated in accordance with the blackness of the picture originally transmitted, and means for charging said tape prior to recording thereon, with a constant charge density.

9. Apparatus as defined in claim 5, comprising in further combination, means for dusting said tape, following electrostatic charging thereof, with a xerographic power of opposite polarity, said means for electrostatically effecting the transfer from the tape to the paper sheet comprising means for creating an electrostatic field in which both the tape and paper move, whereby the powder is withdrawn from the tape upon the paper through electrostatic attraction, means for producing said last-mentioned field in the form of a pulse following disposition of the complete picture line in operative relation with respect to the sheet, means for applying heat to the transferred power on said sheet to fix the same, and means for thereafter cleaning the tape of any remaining adhering particles of powder, and discharging any remaining charge on the tape.

10. Apparatus as defined in claim 9, wherein the means for producing the electrostatic field in which both the paper and tape move comprises a paper drive roller having a conducting surface and a counter electrode having a length of at least a line and located opposite such drive roller.

11. Apparatus as defined in claim 6, wherein the electrode, to which said picture signals are conducted, is constructed as a counter electrode which distributes liquid dye, whereby dye particles from the dye film adhering to the counter electrode are drawn over in quantities by means of electrostatic attraction, said means for electrostatically effecting the transfer from the tape to the sheet comprising means for creating an electrostatic field in which both the tape and paper move, whereby the dye particles are withdrawn from the tape upon the paper through electrostatic attraction, means for producing said last mentioned field in the form of a pulse following disposition of the complete picture lines in operative relation with respect to the sheet, and means for thereafter cleaning the tape of any remaining adhering particles of dye and discharging any remaining charge on the tape.

12. Apparatus as defined in claim 11, wherein the means for producing the electrostatic field in which both the paper and tape move comprises a paper drive roller having a conductive surface and a counter electrode having a length of at least a line and located opposite such drive roller.

13. Apparatus as defined in claim 5, wherein said recording means is operative to place an electrostatic charge on said tape, and said means for producing the electrostatic field in which both the paper and tape move is operative to transfer the charge image on said tape to said paper, and comprising in further combination, means for xerographically developing the charge image on the paper to render it visible and fixed, and means for discharging any remaining charge on the tape.

14. Apparatus as defined in claim 13, wherein the means for producing the electrostatic field in which both the paper and tape move comprises a paper drive roller having a conductive surface and a counter electrode having a length of at least a picture line and located opposite such drive roller.

15. Apparatus as defined in claim 5, wherein said tape and sheet advancing means are operative to continuously transport the tape and sheet at respective constant rates, and constructed to advance the tape the length of one line while the sheet is advanced from one line receiving position to the next.

References Cited

UNITED STATES PATENTS

| | | | |
|---|---|---|---|
| 2,853,551 | 9/1958 | Hell | 178—11 |
| 2,890,923 | 6/1959 | Huebner | 346—74 |
| 3,023,731 | 3/1962 | Schwertz | 346—74 |
| 3,045,644 | 7/1962 | Schwertz | 346—74 |

JOHN W. CALDWELL, *Acting Primary Examiner.*

J. A. ORSINO, *Assistant Examiner.*